(12) United States Patent
Gupta et al.

(10) Patent No.: US 12,192,755 B2
(45) Date of Patent: Jan. 7, 2025

(54) SYSTEMS AND METHODS FOR OBTAINING CONSENT FOR USER DATA SHARING BY A NETWORK

(71) Applicant: Verizon Patent and Licensing Inc., Basking Ridge, NJ (US)

(72) Inventors: Umesh Kumar Gupta, Morris Plains, NJ (US); John Patrick Hickey, III, Metuchen, NJ (US); Raghuram Parvataneni, Plano, TX (US); Mahesh Chapalamadugu, Plano, TX (US); Bjorn Hjelm, Livermore, CA (US); Jyotsna Kachroo, Millburn, NJ (US); Syed Rehman, South Brunswick, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 290 days.

(21) Appl. No.: 17/658,754

(22) Filed: Apr. 11, 2022

(65) Prior Publication Data

US 2023/0328513 A1    Oct. 12, 2023

(51) Int. Cl.
*H04W 12/02*     (2009.01)
*G06F 21/31*     (2013.01)
*H04W 4/14*      (2009.01)
*H04W 12/06*     (2021.01)

(52) U.S. Cl.
CPC ............ *H04W 12/02* (2013.01); *G06F 21/31* (2013.01); *H04W 4/14* (2013.01); *H04W 12/06* (2013.01)

(58) Field of Classification Search
None
See application file for complete search history.

(56) References Cited

U.S. PATENT DOCUMENTS

2019/0116256 A1*  4/2019  Rahman .................. H04W 4/02
2022/0225065 A1*  7/2022  Doken ................ H04L 41/5051

* cited by examiner

Primary Examiner — Frantz Bataille

(57) ABSTRACT

A device may receive a consent address from a user device accessing an application that requires application data associated with consent of a user of the user device, and may provide, to the user device, a consent form associated with the consent address. The device may receive, from the user device, user authentication data provided via the consent form and via a first option or a second option, and may provide, to an application server device associated with the application, a notification indicating that the user authentication data was received. The device may provide, to a cloud service provider web services device, an authorization code and an authorization token based on providing the notification. The cloud service provider web services device may cause the application data to be provided to the application server device based on receiving the authorization code and the authorization token.

20 Claims, 10 Drawing Sheets

User Authorization

User Authorization Required
The application requires access to data that will improve performance of the application, but that needs your consent. Please provide your Username and Password in order to provide consent.

Username: Enter text
Password: Enter text

Forgot password?

Sign in    Cancel

| Device | Data 1 | Data 2 | Data 3 | Date Consent Given |
|---|---|---|---|---|
| AS 1 | X | X | X | mm/dd/yyyy |
| AS 2 | X | | X | mm/dd/yyyy |
| AS 3 | | X | | mm/dd/yyyy |
| AS 4 | X | X | | mm/dd/yyyy |
| AS 5 | X | | | mm/dd/yyyy |
| *** | *** | *** | *** | *** |

FIG. 1G

SYSTEMS AND METHODS FOR OBTAINING CONSENT FOR USER DATA SHARING BY A NETWORK

BACKGROUND

A core network may enable application developers to utilize fourth generation (4G) and fifth generation (5G) network intelligence for advanced intent-based network edge use cases, such as radio access network (RAN)-aware applications, location-aware services, and/or the like.

BRIEF DESCRIPTION OF THE DRAWINGS

FIGS. 1A-1G are diagrams of an example associated with receiving consent for user data sharing by a network.

DETAILED DESCRIPTION OF EXAMPLE EMBODIMENTS

Figure 1A:
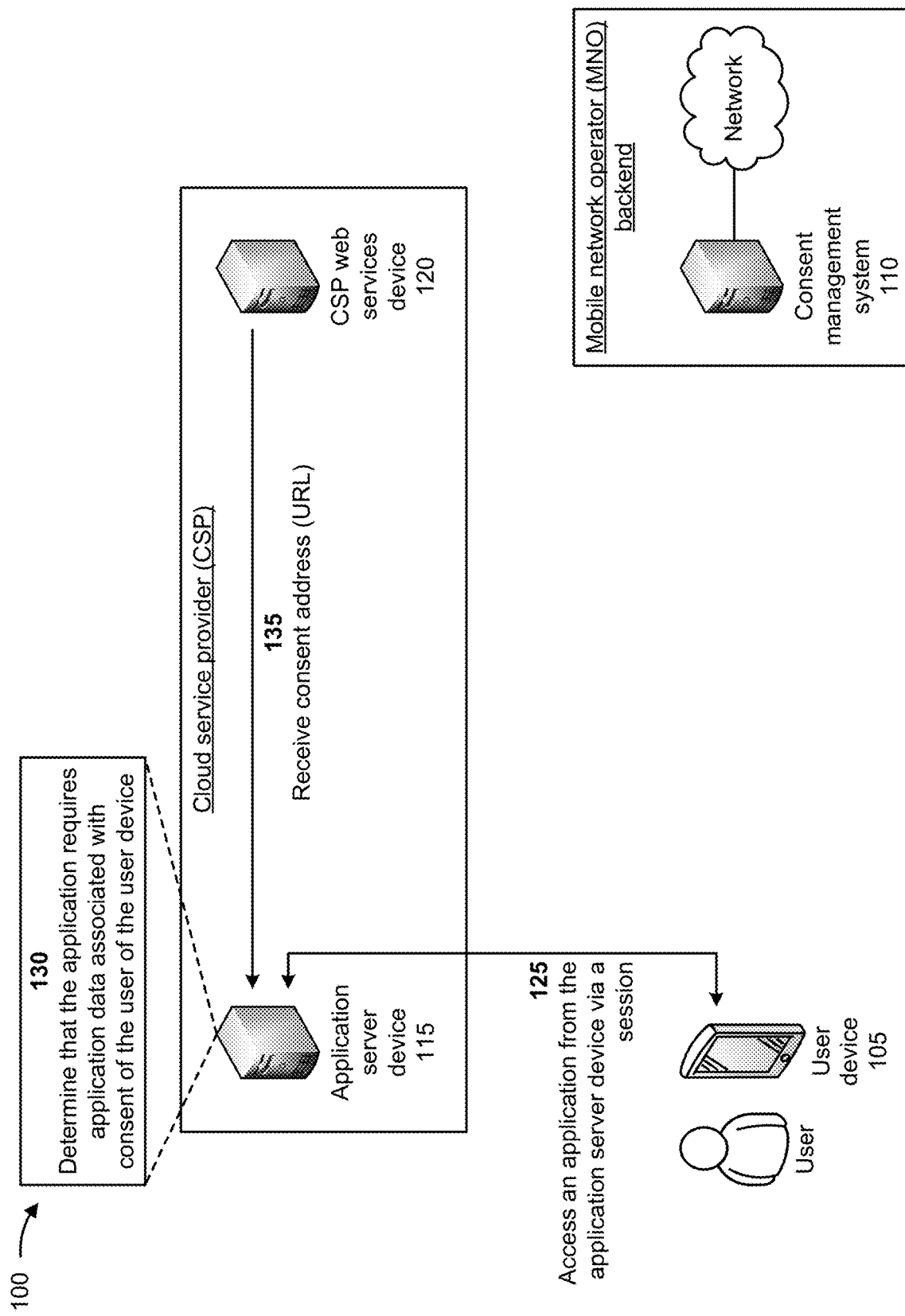

The following detailed description of example implementations refers to the accompanying drawings. The same reference numbers in different drawings may identify the same or similar elements.

Certain applications may require user consent to access user-specific data in order to enhance the applications. Many application service providers (ASPs) provide applications on one or more different cloud platforms. These applications are agnostic to a mobile network operator (MNO) network (e.g., a core network) that the applications utilize for network connectivity. However, these applications may require network-specific data (e.g., requiring user consent via a user device) to improve performance of the applications but may find it challenging to enter relationships with various mobile network operators from both an operational perspective and a development perspective.

Thus, current techniques for improving applications for users consume computing resources (e.g., processing resources, memory resources, communication resources, and/or the like), networking resources, and/or other resources associated with failing to receive the required network-specific data to improve performance of applications, providing a poor quality of experience for the users of the applications, attempting and failing to obtain user consent to utilize the required network-specific data to improve performance of applications, and/or the like.

Some implementations described herein provide a consent management system that receives consent for user data sharing by a network. For example, the consent management system may receive a consent address from a user device accessing an application that requires application data associated with consent of a user of the user device, and may provide, to the user device, a consent form associated with the consent address. The consent management system may receive, from the user device, user authentication data provided via the consent form and via a first option or a second option, and may provide, to an application server device associated with the application, a notification indicating that the user authentication data was received. The consent management system may provide, to a cloud service provider web services device, an authorization code and an authorization token based on providing the notification. The cloud service provider web services device may cause the application data to be provided to the application server device based on receiving the authorization code and the authorization token. The application server device may utilize the application data to improve performance of the application provided to the user device relative to performance of the application without the application data.

In this way, the consent management system receives consent for user data sharing by a network. For example, the consent management system may enable cloud service providers (CSPs) to provide standard interfaces to request and receive the required network-specific data to improve performance of applications. The consent management system may enable mobile network operators to provide the standard interfaces to the cloud service providers, and may enable applications to have a standard mechanism to make a request, with user consent, for the required network-specific data to improve performance of applications. Thus, the consent management system may conserve computing resources, networking resources, and/or other resources that would have otherwise been consumed by failing to receive the required network-specific data to improve performance of applications, providing a poor quality of experience for the users of the applications, attempting and failing to obtain user consent to utilize the required network-specific data to improve performance of applications, and/or the like.

FIGS. 1A-1G are diagrams of an example 100 associated with receiving consent for user data sharing by a network. As shown in FIGS. 1A-1G, example 100 includes a user device 105 associated with a user, a consent management system 110, an application server device 115, and a CSP web services device 120. The consent management system 110 communicate with a network (e.g., a mobile network) and may be provided in an MNO backend. The application server device 115 and the CSP web services device 120 may be provided in a CSP cloud computing environment. The CSP may include one or more application server devices 115 that have a trust relationship with the CSP web services device 120. The CSP web services device 120 may have a trust relationship with the consent management system 110. The application server device 115 may be a multi-access edge computing (MEC) device or a non-MEC device associated with the CSP. Further details of the user device 105, the consent management system 110, the application server device 115, and the CSP web services device 120 are provided elsewhere herein.

As shown in FIG. 1A, and by reference number 125, the user device 105 may access an application from the application server device 115 via a session. For example, the user device 105 may establish a connection (e.g., a session) with the application server device 115 and may request the application from the application server device 115 via the session. The application server device 115 may provide the application to the user device 105 based on the request and via the session.

As further shown in FIG. 1A, and by reference number 130, the application server device 115 may determine that application data is needed requiring consent of the user of the user device 105. For example, the application server device 115 may determine that the application data is needed requiring consent of the user of the user device 105 to improve a user experience for the application relative to a user experience of the application without the application data, to improve performance of the application relative to performance of the application without the application data, and/or the like.

In one example, the application may perform better (e.g., during non-peak hours) if the application server device 115 was provided application data requiring user consent, such as radio access network (RAN) and backhaul congestion, subscriber density, and/or the like. If such application data was available, the application server device 115 may provide radio and backhaul congestion aware application optimization, subscriber density aware application services, and/or the like. Thus, the application server device 115 may determine that such application data is needed and requires consent of the user.

In another example, the application may perform better (e.g., optimization) if the application server device 115 was provided application data requiring user consent, such as a device type of the user device 105, radio connectivity associated with the user device 105, subscription data associated with the user device 105, and/or the like. If such application data was available, the application server device 115 may provide user device type-based application optimization, radio connectivity-based video advertisements and/or application optimization, user device subscription-based application optimization, and/or the like. Thus, the application server device 115 may determine that such application data is needed and requires consent of the user.

In still another example, the application may perform better (e.g., providing location-based services) if the application server device 115 was provided application data requiring user consent, such as location services associated with the user device 105. If such application data was available, the application server device 115 may provide geo-fencing for the user device 105, location verification of the user device 105, proximity-based services, location aware services, mobility prediction services, network-aware path planning, and/or the like. Thus, the application server device 115 may determine that such application data is needed and requires consent of the user.

In another example, the application may perform better (e.g., better user experience) if the application server device 115 was provided application data requiring user consent, such as RAN conditions associated with the user device 105, backhaul conditions associated with the user device 105, and/or the like. If such application data was available, the application server device 115 may adjust applications provided to the user device based on the RAN conditions for an improved user experience, adjust video resolution attributes based on the RAN conditions to reduce backhaul traffic, and/or the like. Thus, the application server device 115 may determine that such application data is needed and requires consent of the user.

In still another example, the application may perform better (e.g., based on network conditions, the application server device 115 may adjust a size of an image and thus improve a quality of experience) if the application server device 115 was provided application data requiring user consent, such as end-to-end network performance (e.g., improved quality of experience) associated with the user device 105. If such application data was available, the application server device 115 may provide traffic differentiation based on the latency of the network, network slicing and traffic differentiation for the application, and/or the like. Thus, the application server device 115 may determine that such application data is needed and requires consent of the user.

In an example use case, a video streaming application provider may wish to utilize network data for providing an optimal service experience to its customers. The video streaming application provider may deliver live streaming (e.g., sporting events, media events, and/or the like) to customers on mobile devices and television devices. As part of the user experience, the video streaming application provider may want to place a streaming server, hosted on a CSP cloud computing environment, as close to its customer locations as possible, and may want to monitor a quality of service (QoS) of the customer sessions to make intelligent decisions about optimizing the quality of the streaming video. For the purpose of obtaining the customer locations and the QoS data, the video streaming application provider may wish to obtain network-based location and QoS data for each of the customer sessions from a mobile network operator. However, the mobile network operator may require consent from the customers for sharing any of the customer network-related data to application providers. A similar consent flow described above for the example use case may be applicable to the other use case. Obtaining such consents is described elsewhere herein. Once the consents are obtained for the consent flow, the video streaming application may utilize the mobile network operator's network-based location and QoS data for each of the customer sessions.

As further shown in FIG. 1A, and by reference number 135, the application server device 115 may receive a consent address (e.g., a uniform resource locator (URL) address) identifying a consent form for the user of the user device 105. For example, the application server device 115 may generate a request for the consent address based on determining that the application data is needed requiring the consent of the user of the user device 105. The application server device 115 may provide the request to the CSP web services device 120, and the CSP web services device 120 may provide the consent address to the application server device 115 based on the request for the consent address. The application server device 115 may receive the consent address, identifying the consent form for the user of the user device 105, from the CSP web services device 120.

Figure 1B:
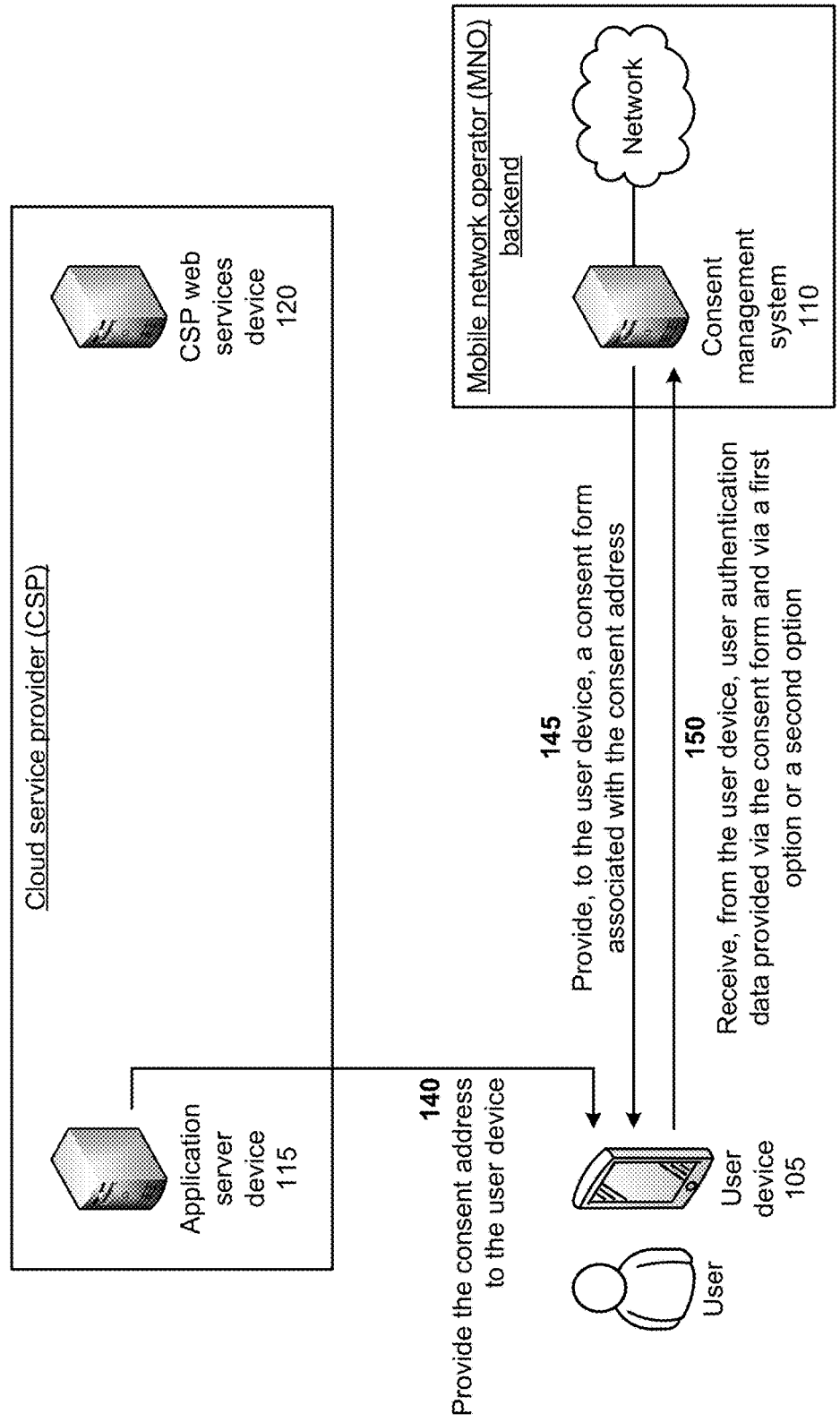

As shown in FIG. 1B, and by reference number 140, the application server device 115 may provide the consent address to the user device 105. For example, the application server device 115 may provide the consent address to the user device 105 via the session and/or application being utilized by the user device 105. In some implementations, the user device 105 may display the consent address to the user (e.g., as a hyperlink) and may request that the user select the hyperlink in order to receive a consent form associated with improving performance of the application.

As further shown in FIG. 1B, and by reference number 145, the consent management system 110 may provide, to the user device 105, a consent form associated with the consent address. For example, if the user of the user device 105 selects the hyperlink for the consent address, the user device 105 may provide the consent address to the consent management system 110. The consent management system 110 may identify the consent form associated with the consent address, and may provide the consent form to the user device 105. The user device 105 may receive the consent form and may display the consent form to the user. An example of the consent form is described below in connection with FIG. 1C.

As further shown in FIG. 1B, and by reference number 150, the consent management system 110 may receive, from the user device 105, user authentication data provided via the consent form and via a first option or a second option. For example, the user may utilize the user device 105 to input the user authentication data (e.g., a username and a password) into the displayed consent form. The user may select a sign-in selection mechanism (e.g., a button, a link, a menu, and/or the like) that, when selected, may cause the user device 105 to provide the user authentication data to the consent management system 110. The consent management system 110 may receive the user authentication data from the user device 105. In some implementations, when receiving the user authentication data via the first option, the consent management system 110 may receive the user authentication data, from the user device 105, via an over-the-top (OTT) short message service (SMS). In some implementations, when receiving the user authentication data via the second option, the consent management system 110 may receive the user authentication data via a silent authentication received from the user of the user device 105. A silent authentication is a mechanism that analyzes both user behavioral and environmental patterns, such as a way a user writes on the user device 105, a way the user walks with the user device 105, a geolocation of the user device 105, and/or the like. A silent authentication may also utilize signals surrounding the user device 105, such as Bluetooth devices and Wi-Fi networks.

FIG. 1C depicts an example user interface that includes an example consent form for entering the user authentication data (e.g., the username and the password). As shown, the example consent form may indicate that user authorization is required since the application requires access to data that will improve performance of the application, but that needs the user's consent. The example consent form may also instruct the user to input a username and a password (e.g., the user authentication data) in order to provide consent to share the application data. After entering the username and password, the user may select the sign-in button to cause the user device 105 to provide the user authentication data to the consent management system 110.

Figure 1D:
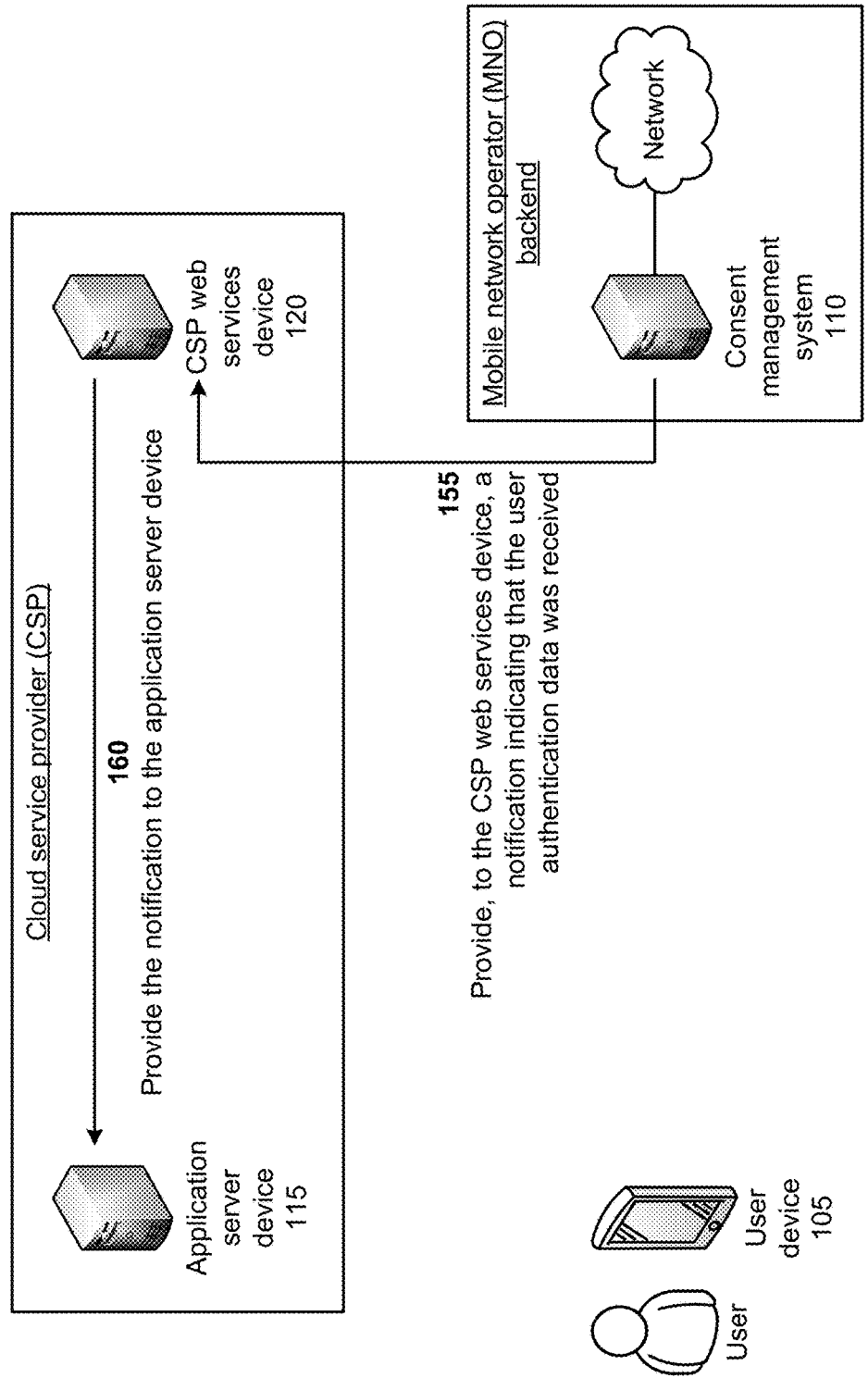

As shown in FIG. 1D, and by reference number 155, the consent management system 110 may provide, to the CSP web services device 120, a notification indicating that the user authentication data was provided. For example, when the user authentication data is received, the consent management system 110 may store, in a data structure (e.g., a database, a table, a list, and/or the like), data indicating a date and a time when the user authentication data was received from the user device 105. An example of the data structure is described below in connection with FIG. 1G. When the user authentication data is received, the consent management system 110 may generate the notification indication that the user authentication data was provided by the user of the user device 105. In some implementations, the consent management system 110 may verify that the user authentication data is valid and correct prior to generating the notification. The consent management system 110 may provide the notification to the CSP web services device 120, and the CSP web services device 120 may receive the notification indicating that the user authentication data was provided.

As further shown in FIG. 1D, and by reference number 160, the CSP web services device 120 may provide the notification to the application server device 115. For example, when the CSP web services device 120 receives the notification indicating that the user authentication data was provided, the CSP web services device 120 may forward the notification to the application server device 115. The application server device 115 may receive the notification indicating that the user authentication data was provided. When the consent URL is displayed, the consent management system 110 may inform, via URL re-direct to the CSP web services device 120, that consent is taken and the CSP web services device 120 may in turn inform the application server device 115 that consent is granted.

Figure 1E:
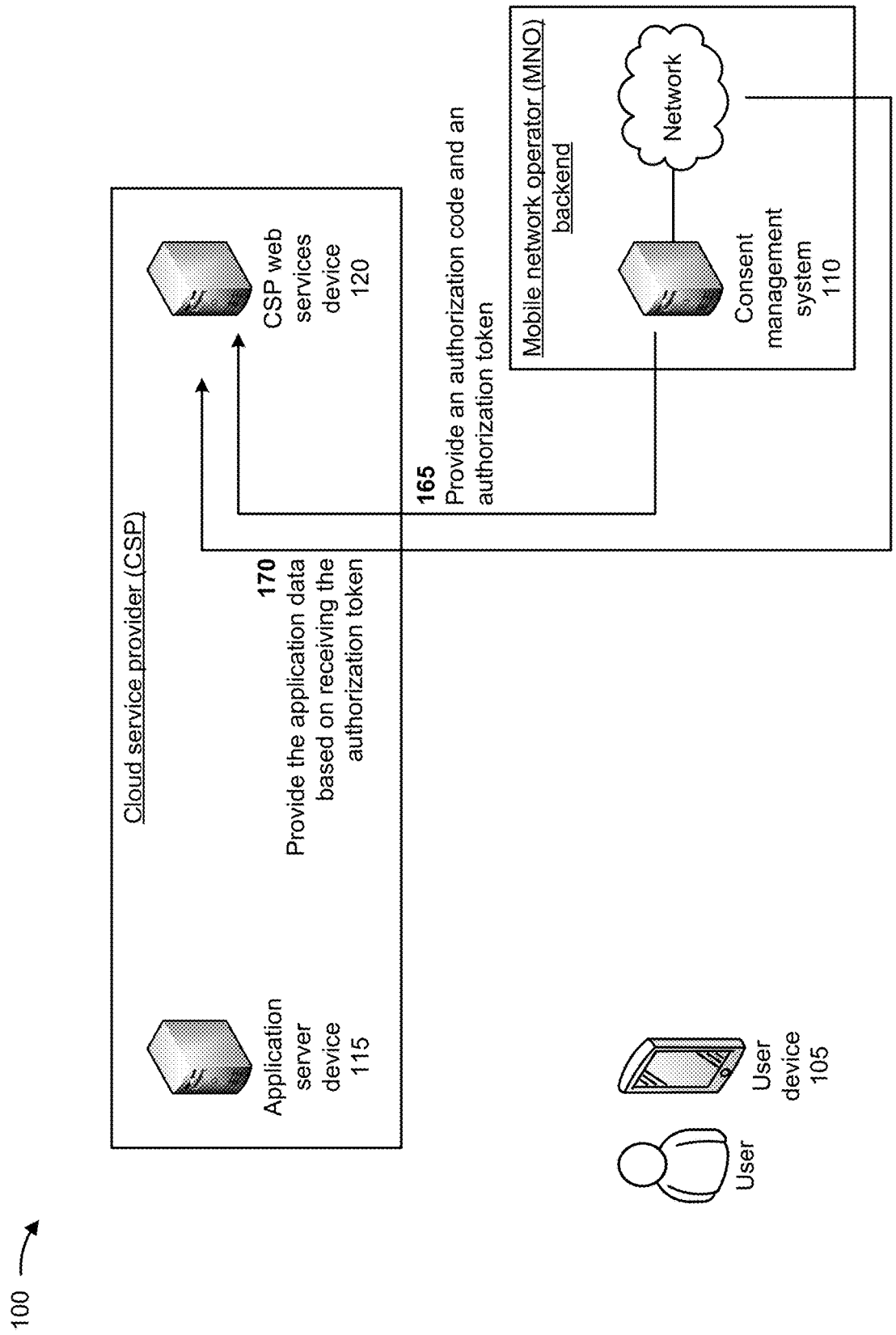

As shown in FIG. 1E, and by reference number 165, the consent management system 110 may provide an authorization code and an authorization token to the CSP web services device 120 based on the notification. For example, the consent management system 110 may generate the authorization code and the authorization token when the notification is provided to the application server device 115. The authorization code and the authorization token may provide proof that user of the user device 105 provided consent to sharing the application data. The consent management system 110 may provide the authorization code and the authorization token to the CSP web services device 120, and the CSP web services device 120 may provide the authorization token to the application server device 115.

As further shown in FIG. 1E, and by reference number 170, the network may provide the application data to the CSP web services device 120 based on receiving the authorization token from the CSP web services device 120. For example, the authorization token may include data identifying the application data for which consent was granted. The CSP web services device 120 may provide the authorization token to the network, and the network may retrieve the application data based on the data identifying the application data included in the authorization token. The network may provide the retrieved application data to the CSP web services device 120 based on receiving the authorization token from the CSP web services device 120.

Figure 1F:
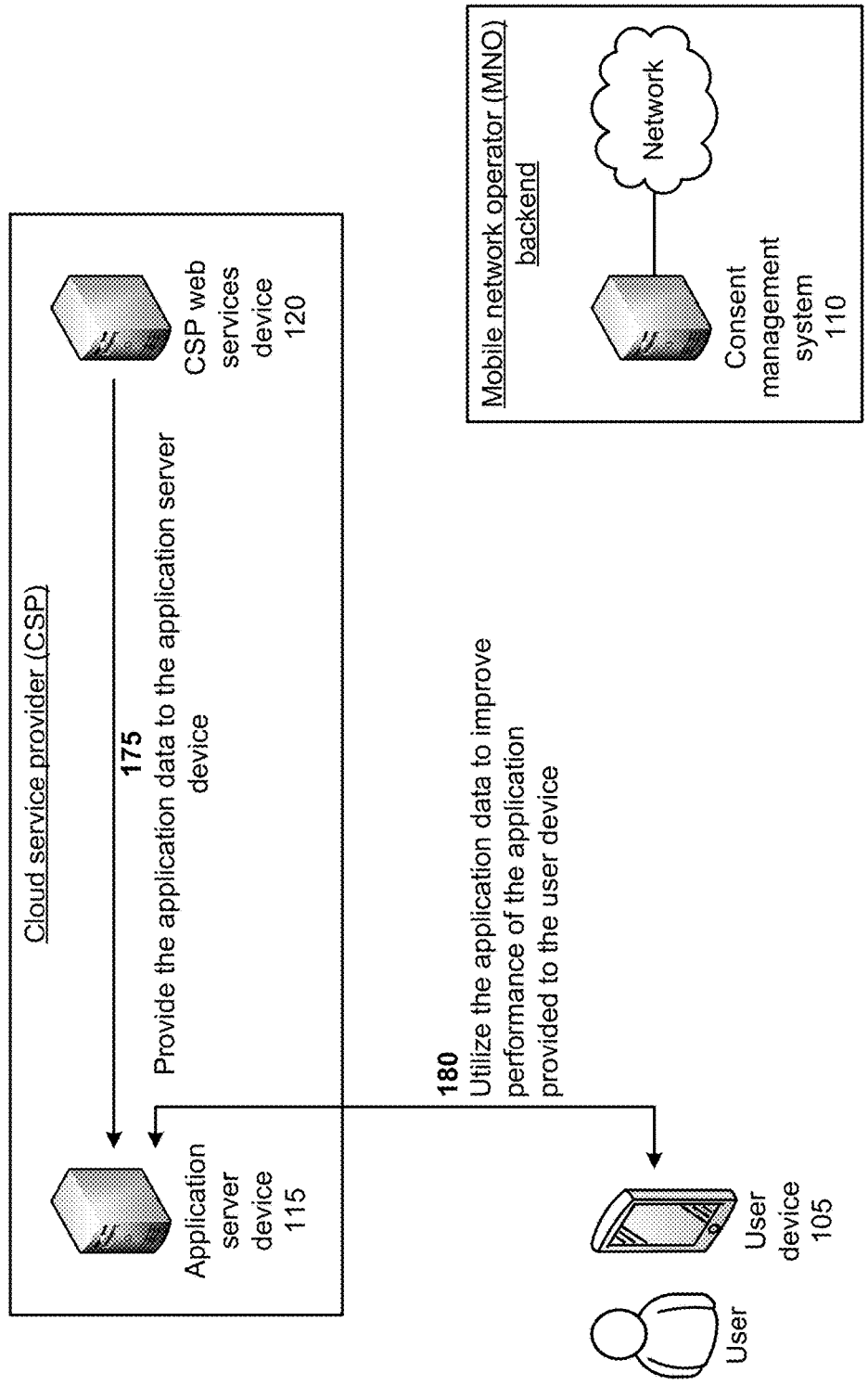

As shown in FIG. 1F, and by reference number 175, the CSP web services device 120 may provide the application data to the application server device 115. For example, the CSP web services device 120 may receive the application data from the network, and may forward the application data to the application server device 115. The application server device 115 may receive the application data.

As further shown in FIG. 1F, and by reference number 180, the application server device 115 may utilize the application data to improve performance of the application provided to the user device. For example, the application server device 115 may utilize the application data to improve the performance (e.g., a user experience) of the application relative to performance of the application without the application data. As described above, the application data may enable the application server device 115 to provide, to the user device 105, radio and backhaul congestion-aware application optimization, subscriber density-aware application services, user device type-based application optimization, radio connectivity-based video advertisements and application optimization, device subscription-based application optimization, location-based services for the application, RAN-aware advertisements for the application, RAN-aware video optimization for the application, network slicing for the application, and/or the like.

FIG. 1G depicts an example data structure that may be stored by the consent management system 110. As shown, the consent management system 110 may manage multiple application server devices 115, such as first application server (AS 1), a second application server (AS 2), a third application server (AS 3), and/or the like. Each of the multiple application server devices 115 may receive consent to utilize different data (e.g., Data 1, Data 2, Data 3, and/or the like) for improving performances of applications offered by the multiple application server devices 115 to multiple user devices 105. As further shown, the data structure may include a field identifying a data and a time when consent was granted to utilize the different data by the multiple application server devices 115.

In this way, the consent management system 110 receives consent for user data sharing by a network. For example, the consent management system 110 may enable CSPs to provide standard interfaces to request and receive the required network-specific data to improve performance of applications. The consent management system 110 may enable mobile network operators to provide the standard interfaces to the cloud service providers, and may enable applications to have a standard mechanism to make a request, with user consent, for the required network-specific data to improve performance of applications. Thus, the consent management system 110 may conserve computing resources, networking resources, and/or other resources that would have otherwise been consumed by failing to receive the required network-specific data to improve performance of applications, providing a poor quality of experience for the users of the applications, attempting and failing to obtain user consent to utilize the required network-specific data to improve performance of applications, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
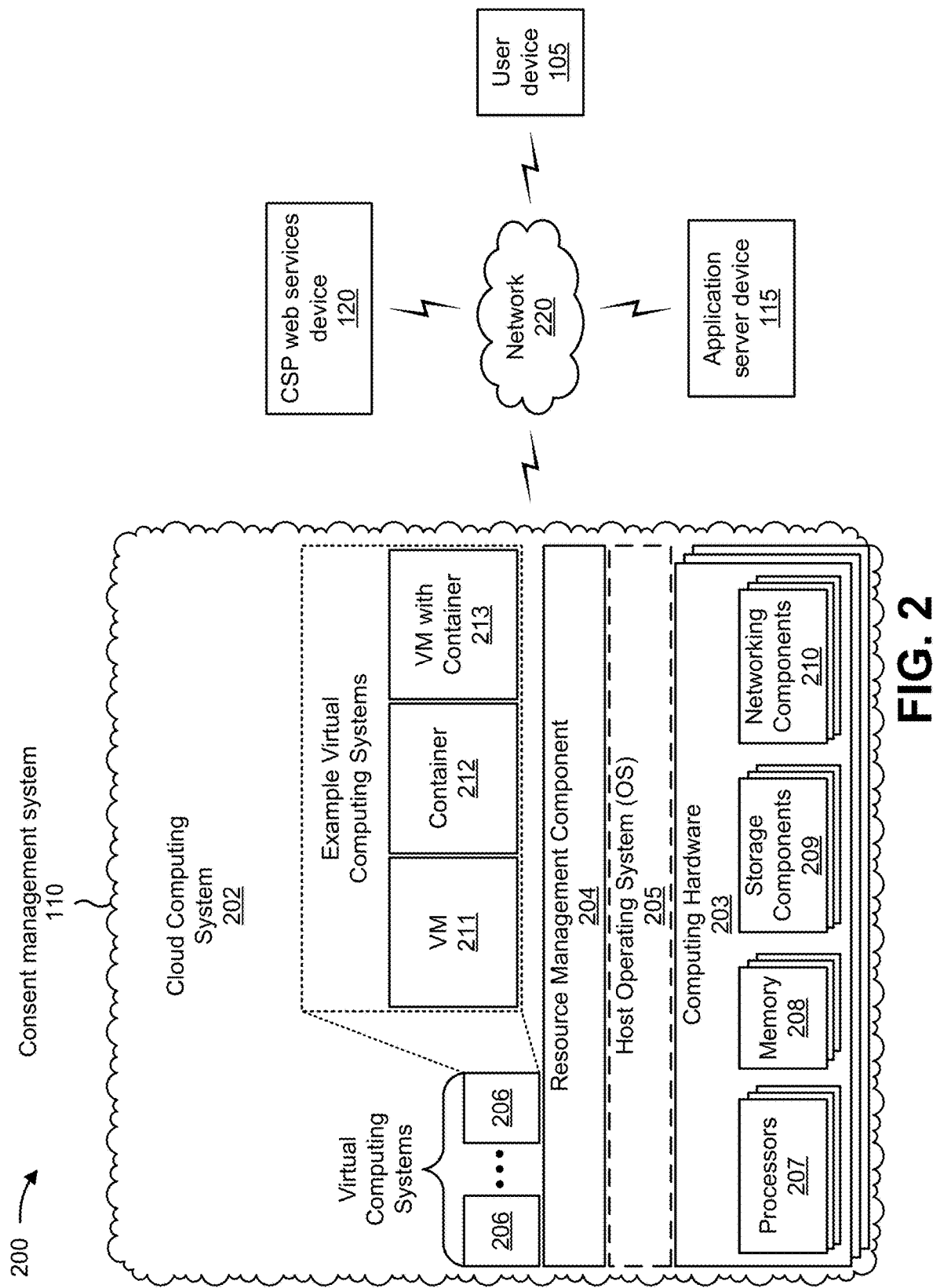
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the consent management system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The application server device 115 includes one or more devices capable of receiving, generating, storing, processing, providing, and/or routing information, as described elsewhere herein. The application server device 115 may include a communication device and/or a computing device. For example, the application server device 115 may include a server, such as an application server, a client server, a web server, a database server, a host server, a proxy server, a virtual server (e.g., executing on computing hardware), or a server in a cloud computing system. In some implementations, the application server device 115 includes computing hardware used in a cloud computing environment.

The CSP web services device 120 includes one or more devices capable of receiving, generating, storing, processing, providing, and/or routing information, as described elsewhere herein. The CSP web services device 120 may include a communication device and/or a computing device. For example, the CSP web services device 120 may include a server, such as an application server, a client server, a web server, a database server, a host server, a proxy server, a virtual server (e.g., executing on computing hardware), or a server in a cloud computing system. In some implementations, the CSP web services device 120 includes computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the consent management system 110 may include one or more elements 203-213 of the cloud computing system 202, may execute within the cloud computing system 202, and/or may be hosted within the cloud computing system 202, in some implementations, the consent management system 110 may not be cloud-based (e.g., may be implemented outside of a cloud computing system) or may be partially cloud-based. For example, the consent management system 110 may include one or more devices that are not part of the cloud computing system 202, such as the device 300 of FIG. 3, which may include a standalone server or another type of computing device. The consent management system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
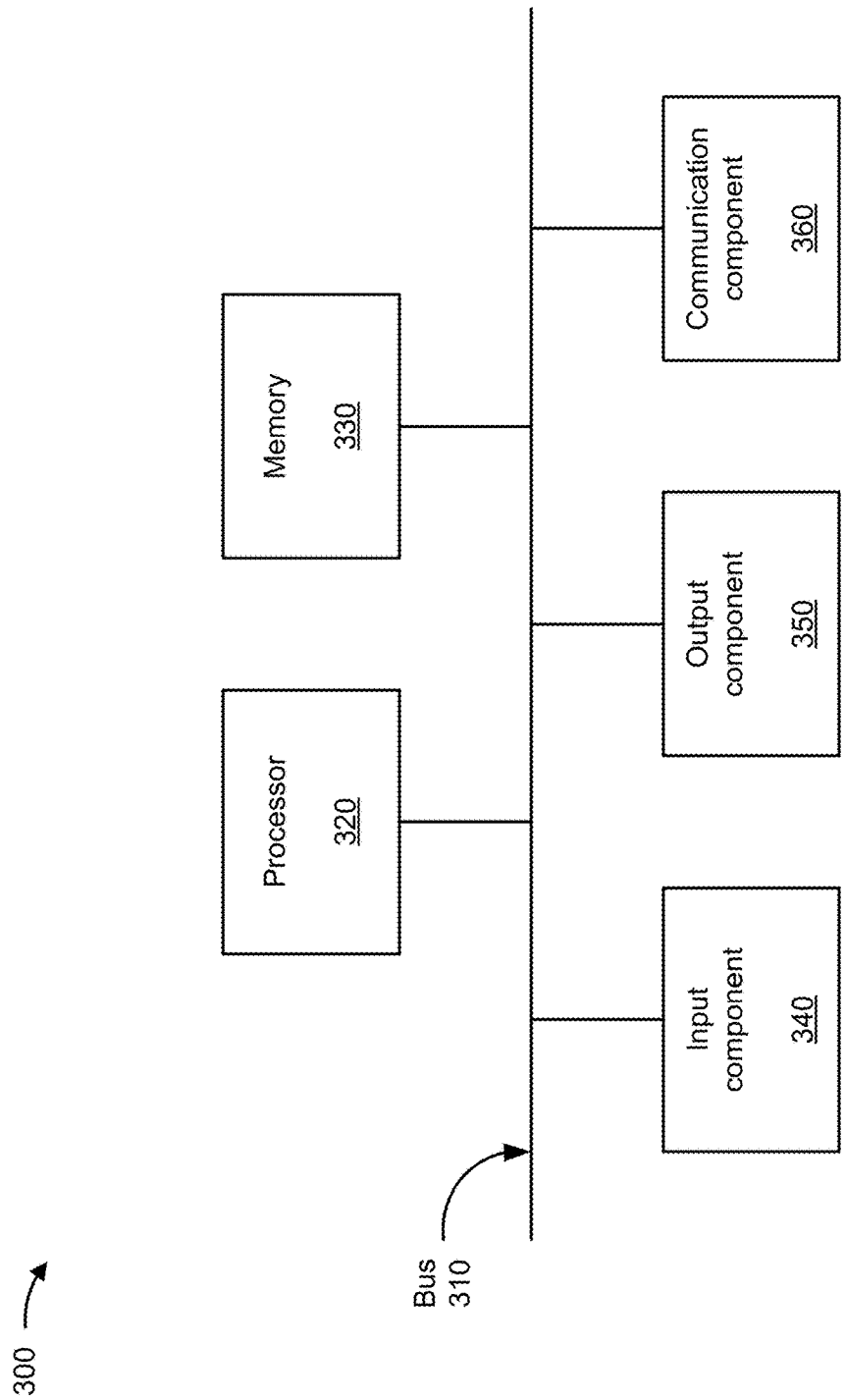
FIG. 3 is a diagram of example components of one or more devices of FIG. 2.

FIG. 3 is a diagram of example components of a device 300, which may correspond to the user device 105, the consent management system 110, the application server device 115, and/or the CSP web services device 120. In some implementations, the user device 105, the consent management system 110, the application server device 115, and/or the CSP web services device 120 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
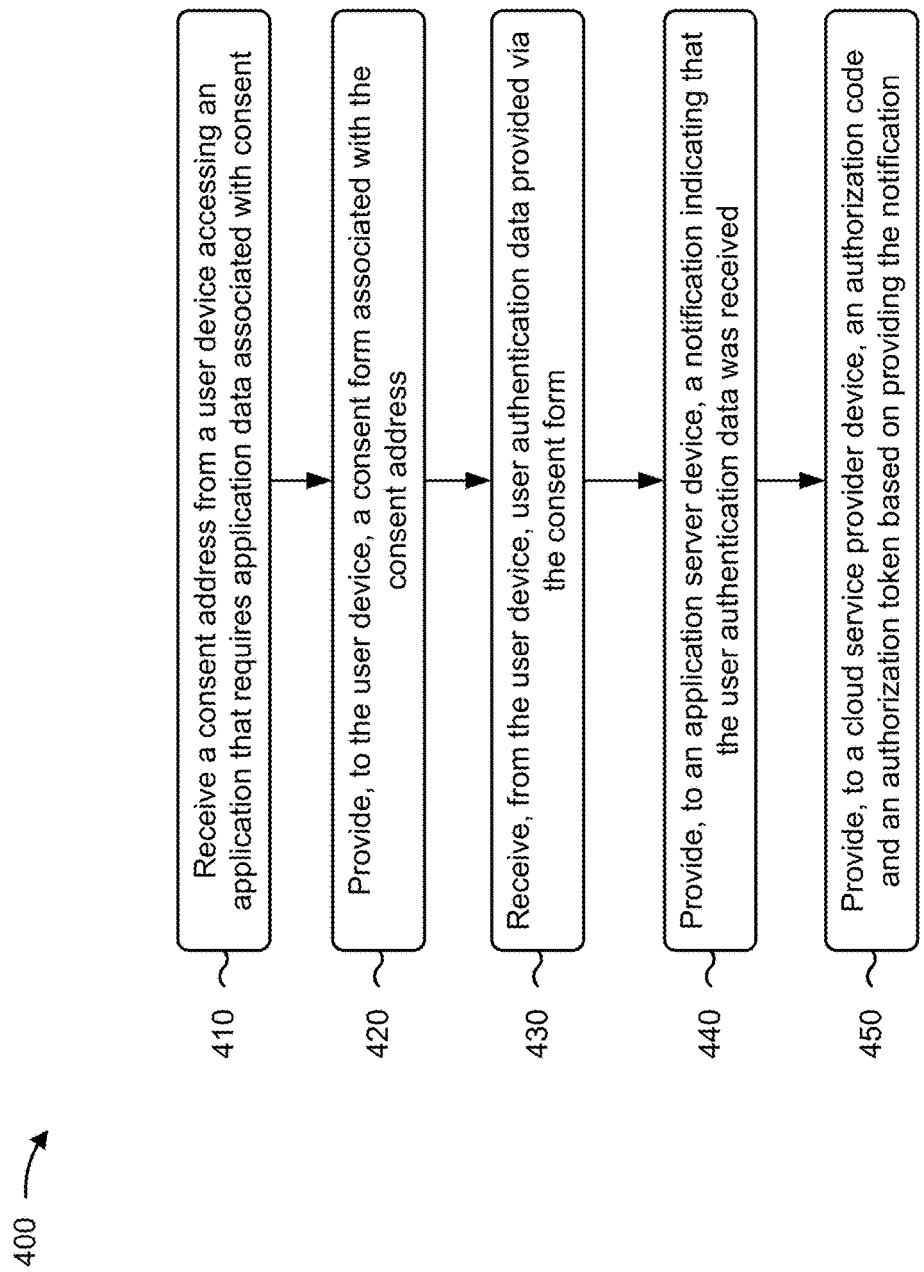
FIG. 4 is a flowchart of an example process for receiving consent for user data sharing by a network.

FIG. 4 is a flowchart of an example process 400 for receiving consent for user data sharing by a network. In some implementations, one or more process blocks of FIG. 4 may be performed by a device (e.g., the consent management system 110). In some implementations, one or more process blocks of FIG. 4 may be performed by another device or a group of devices separate from or including the device, such as an application server device (e.g., the application server device 115) and/or a CSP web services device (e.g., the CSP web services device 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a consent address from a user device accessing an application that requires application data associated with consent (block 410). For example, the device may receive a consent address from a user device accessing an application that requires application data associated with consent of a user of the user device, as described above. In some implementations, the device is a consent management system provided in a mobile network operator backend. In some implementations, the consent address is received from the cloud service provider web services device, via the application server device.

In some implementations, the application data includes network-specific data from a network associated with the user device. In some implementations, the application data is associated with one or more of networking congestion data for a network associated with the user device, application optimization for a type of the user device, location services associated with the user device, networking aware advertisements, networking aware video optimization, or network slicing.

As further shown in FIG. 4, process 400 may include providing, to the user device, a consent form associated with the consent address (block 420). For example, the device may provide, to the user device, a consent form associated with the consent address, as described above. In some implementations, the consent form includes a mechanism for the user of the user device to consent to provision of the application data to the application server device.

As further shown in FIG. 4, process 400 may include receiving, from the user device, user authentication data provided via the consent form (block 430). For example, the device may receive, from the user device, user authentication data provided via the consent form and via a first option or a second option, as described above. In some implementations, receiving the user authentication data provided via the first option includes receiving the user authentication data via an over-the-top short message service. In some implementations, receiving the user authentication data provided via the second option includes receiving the user authentication data via a silent authentication received from the user of the user device. In some implementations, the user authentication data includes an indication that the user of the user device consents to provision of the application data to the application server device.

As further shown in FIG. 4, process 400 may include providing, to an application server device, a notification indicating that the user authentication data was received (block 440). For example, the device may provide, to an application server device associated with the application, a notification indicating that the user authentication data was received, as described above. In some implementations, the application server device is a multi-access edge computing (MEC) device or a non-MEC device associated with a cloud service provider. In some implementations, the application server device is configured to provide the application to the user device via a session.

As further shown in FIG. 4, process 400 may include providing, to a cloud service provider web services device, an authorization code and an authorization token based on providing the notification (block 450). For example, the device may provide, to a cloud service provider web services device, an authorization code and an authorization token based on providing the notification, as described above. In some implementations, the cloud service provider web services device may cause the application data to be provided to the application server device based on receiving the authorization code and the authorization token. In some implementations, the application server device may utilize the application data to improve performance of the application provided to the user device relative to performance of the application without the application data. In some implementations, the cloud service provider web services device may provide the authorization code and the authorization token to a network with the application data.

In some implementations, process 400 includes storing, in a data structure, data indicating a date and a time when the user authentication data was received from the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a consent address from a user device accessing an application that requires application data associated with consent of a user of the user device;
   providing, by the device and to the user device, a consent form associated with the consent address;
   receiving, by the device and from the user device, user authentication data provided via the consent form and via a first option or a second option;
   providing, by the device and to an application server device associated with the application, a notification indicating that the user authentication data was received; and
   providing, by the device and to a cloud service provider web services device, an authorization code and an authorization token based on providing the notification,
     wherein the cloud service provider web services device is configured to cause the application data to be provided to the application server device based on receiving the authorization code and the authorization token, and
     wherein the application server device is configured to utilize the application data to improve performance of the application provided to the user device relative to performance of the application without the application data.

2. The method of claim 1, further comprising:
   storing, in a data structure, data indicating a date and a time when the user authentication data was received from the user device.

3. The method of claim 1, wherein receiving the user authentication data provided via the first option comprises:
   receiving the user authentication data via an over-the-top short message service.

4. The method of claim 1, wherein receiving the user authentication data provided via the second option comprises:
   receiving the user authentication data via a silent authentication received from the user of the user device.

5. The method of claim 1, wherein the cloud service provider web services device is configured to provide the authorization code and the authorization token to a network with the application data.

6. The method of claim 1, wherein the device is a consent management system provided in a mobile network operator backend.

7. The method of claim 1, wherein the consent address is received from the cloud service provider web services device, via the application server device.

8. A device, comprising:
   one or more processors configured to:
     receive a consent address from a user device accessing an application that requires application data associated with consent of a user of the user device;
     provide, to the user device, a consent form associated with the consent address;
     receive, from the user device, user authentication data provided via the consent form and via a first option or a second option;
     provide, to an application server device associated with the application, a notification indicating that the user authentication data was received; and
     provide, to a cloud service provider web services device, an authorization code and an authorization token based on providing the notification,
       wherein the cloud service provider web services device is configured to cause the application data to be provided to the application server device based on receiving the authorization code and the authorization token.

9. The device of claim 8, wherein the application server device is a multi-access edge computing (MEC) device or a non-MEC device associated with a cloud service provider.

10. The device of claim 8, wherein the consent form includes a mechanism for the user of the user device to consent to provision of the application data to the application server device.

11. The device of claim 8, wherein the application data includes network-specific data from a network associated with the user device.

12. The device of claim 8, wherein the application data is associated with one or more of:
   network congestion data for a network associated with the user device,
   application optimization for a type of the user device,
   location services associated with the user device,
   network aware advertisements,
   network aware video optimization, or
   network slicing.

13. The device of claim 8, wherein the application server device is configured to provide the application to the user device via a session.

14. The device of claim 8, wherein the user authentication data includes an indication that the user of the user device consents to provision of the application data to the application server device.

15. A non-transitory computer-readable medium storing a set of instructions, the set of instructions comprising:
one or more instructions that, when executed by one or more processors of a device, cause the device to:
receive a consent address from a user device accessing an application that requires application data associated with consent of a user of the user device;
provide, to the user device, a consent form associated with the consent address;
receive, from the user device, user authentication data provided via the consent form and via a first option or a second option;
provide, to an application server device associated with the application, a notification indicating that the user authentication data was received;
provide, to a cloud service provider web services device, an authorization code and an authorization token based on providing the notification,
wherein the cloud service provider web services device is configured to cause the application data to be provided to the application server device based on receiving the authorization code and the authorization token,
wherein the application server device is configured to utilize the application data to improve performance of the application provided to the user device relative to performance of the application without the application data; and
store, in a data structure, data indicating a date and a time when the user authentication data was received from the user device.

16. The non-transitory computer-readable medium of claim 15, wherein the one or more instructions, that cause the device to receive the user authentication data provided via the first option, cause the device to:
receive the user authentication data via an over-the-top short message service.

17. The non-transitory computer-readable medium of claim 15, wherein the cloud service provider web services device is configured to provide the authorization code and the authorization token to a network with the application data.

18. The non-transitory computer-readable medium of claim 15, wherein the cloud service provider web services device is configured to receive the application data from a network with the application data.

19. The non-transitory computer-readable medium of claim 15, wherein the consent address is received from the cloud service provider web services device, via the application server device.

20. The non-transitory computer-readable medium of claim 15, wherein the application server device is a multi-access edge computing (MEC) device or a non-MEC device associated with a cloud service provider.

* * * * *